(No Model.)  2 Sheets—Sheet 1.

W. E. AYRTON & J. PERRY.
SYSTEM OF ELECTRICAL HAULAGE.

No. 295,094.  Patented Mar. 11, 1884.

WITNESSES:

INVENTORS.
William Edward Ayrton
John Perry (No Model.) 2 Sheets—Sheet 2.

W. E. AYRTON & J. PERRY.
SYSTEM OF ELECTRICAL HAULAGE.

No. 295,094. Patented Mar. 11, 1884.

WITNESSES:
Geo. S. Penney
Alex Scott

INVENTORS.
William Edward Ayrton
John Perry,
By Jas. L. Ewin, Attorney.

N. PETERS, Photo-Lithographer, Washington, D. C.

UNITED STATES PATENT OFFICE.

WILLIAM E. AYRTON AND JOHN PERRY, OF LONDON, ENGLAND.

SYSTEM OF ELECTRICAL HAULAGE.

SPECIFICATION forming part of Letters Patent No. 295,094, dated March 11, 1884.

Application filed April 18, 1883. (No model.) Patented in England July 17, 1882, No. 3,380.

*To all whom it may concern:*

Be it known that we, WILLIAM EDWARD AYRTON, professor of technical physics, Fellow of the Royal Society, and JOHN PERRY, professor of mechanical engineering and applied mathematics of the city and guilds of London Technical College, subjects of Her Britannic Majesty the Queen of Great Britain and Ireland, residing in London, England, have invented a new and useful System of Electrical Haulage, (for which we have obtained a patent in England, No. 3,380, dated July 17, 1882,) of which the following is a specification.

The object of our present invention is to provide for obtaining a much greater haulage-power on a single rail or rope traction-road electrically worked than can be obtained from the simple tractive power or adhesion of the moving electrical traction motor or motors. The means by which we attain this object are illustrated by two sheets of drawings, which accompany this specification as parts thereof.

Figure 1:
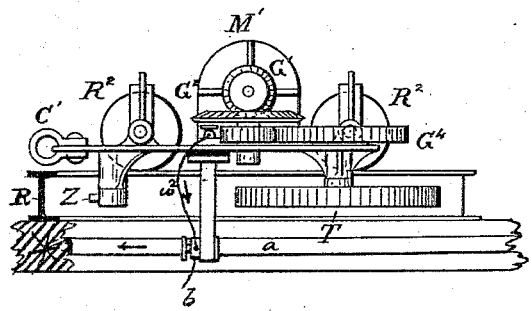
Figure 2:
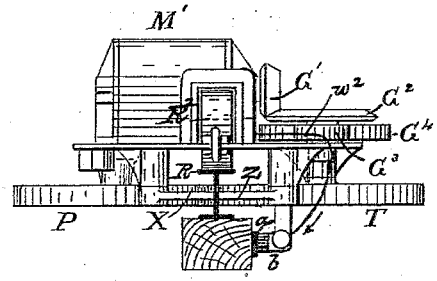
Figure 3:
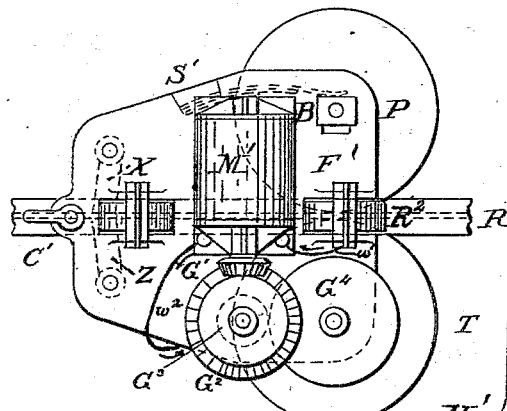
Figure 4:
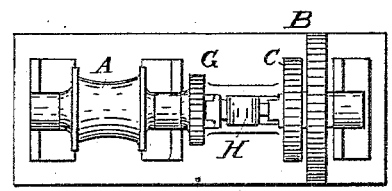
Figure 5:
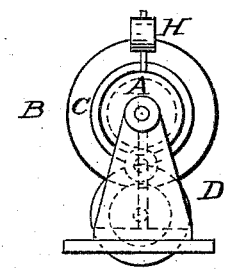
Figure 6:
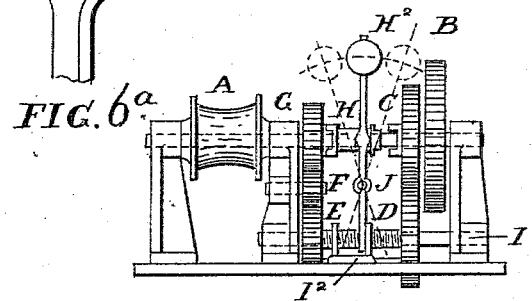
Figure 7:
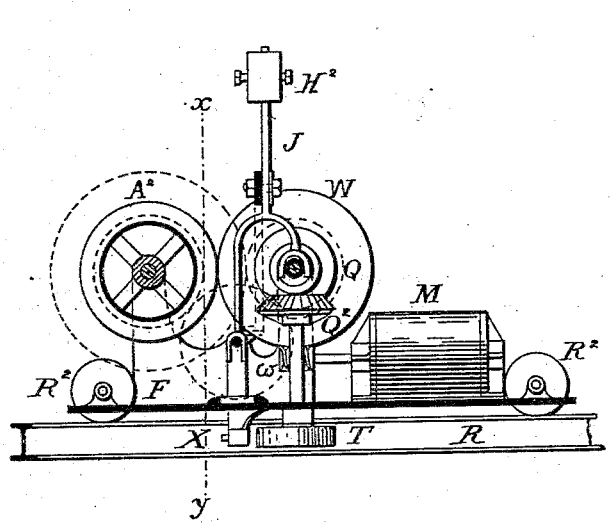
Figure 8:
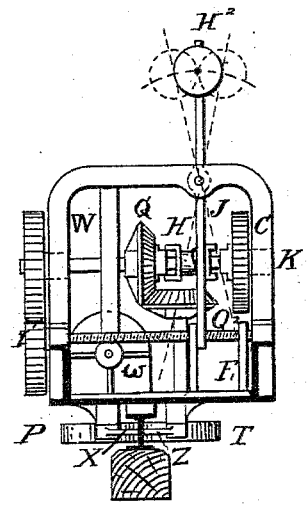
Figure 9:
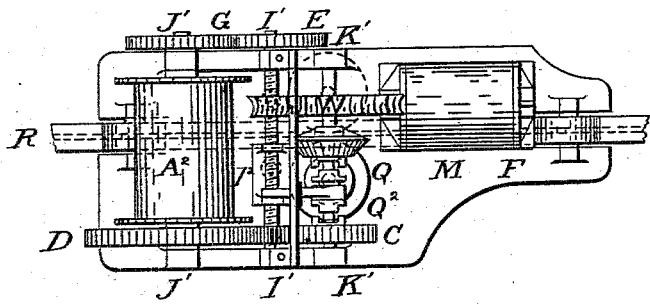
Figure 10:
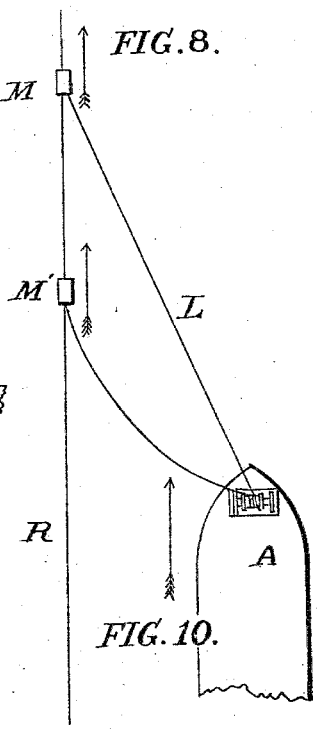

Figure 1 is a side elevation of a traveling motor fitted with "tail-grips" to suit our system of haulage. Fig. 2 is an end elevation of the same. Fig. 3 is a plan of the same. Fig. 4 is a plan of an automatic reversing-winch, to be employed on a boat or wagon in conjunction with preceding traveling motor to effect system of haulage; Fig. 5, end view of the same; Fig. 6, side elevation of the same. Fig. $6^a$ is a perspective detail of the reversing-clutch slide. Fig. 7 is a side elevation of a combined traveling motor and automatic reversing haulage-winch employed to effect our system of haulage. Fig. 8 is an end view of the same. Fig. 9 is a plan of the same. Fig. 10 is a diagrammatic view of two motors and a canal-boat as employed in our system of haulage.

Like letters refer to similar parts in the different views of the same appliance.

In Figs. 1, 2, and 3, R represents a double-flanged rail, upon which the traction-motor represented by the remainder of the figure travels. Of the latter, $R^2 R^2$ represent the weight-supporting wheels; F, the "frame" carrying the axles of said wheels and the remainder of the device; M′, the motor proper, of any approved description; G′, a bevel-pinion on its shaft, and $G^2 G^3 G^4$ an ordinary train of gearing transmitting rotary motion from said pinion to the shaft or axle of the traction wheel or wheels. (Represented by T.) P represents a pressing wheel or wheels, B the sliding box or boxes of the same, and S′ a suitable spring pressing the said box or boxes inward. C′ represents a clevis or hook to engage with a hauling-line of rope or chain, and X Z automatic tail-grips with their springs. These tail-grips—which constitute the distinguishing characteristic or peculiar feature common to the traction-motors of our haulage system—are so pressed upon and inclined to the rail that they automatically seize and hold the latter with an immovable grip when the motor is dragged backward by the haulage strain, while at the same time the tail-grips immediately release their hold and allow the traction-motor to move forward without resistance so soon as the tractive effort of the motor exceeds the haulage resistance. As illustrative circuit-connections, we have shown in said Figs. 1, 2, and 3 insulated wires $w′ w^2$ connecting the respective poles of the motor M′ with the axle of one of the weight-supporting wheels $R^2$, and to a brush, $b$, in constant contact with a return-conductor, $a$, attached to the wooden support of the rail R, said rail being of iron or steel, forming the "main cable," by which the electricity is supplied from the usual dynamo-station at one end.

The boat, wagon, car, or train to be hauled (represented diagrammatically by the bow of a canal-boat in Fig. 10) is connected with the traction motor or motors (represented by M M′ in this diagram) by a hauling-line, L, of considerable length, through the medium of an ordinary winch or winding-drum, A. (Shown upon the boat in Fig. 10.) The boat, wagon, car, or train may thus be furnished with an ordinary winch or power-geared winding-drum, driven in the ordinary manner by an electrical rotary motor, (to which the current may be conveniently supplied from secondary storage-batteries on the boat,) or by other mechanical means; and when an excessive grade or an especially swift current has to be encountered, and the haulage strain becomes more than the traveling traction-motor can overcome, the traction-motor, by means of said tail-grips X Z, grips the rail, and thus becomes a fixed point in advance, holding the hauling-line L while the latter is hauled in by the winch or winding-drum A. A single electrical traction-motor, provided with tail-grips, as aforesaid, may obviously so coact with a hauling-line and a winch or winding-drum; but we prefer to employ two or a pair of traction-motors, as represented by M M' in Fig. 10, so that the rearmost may haul, or, when fixed to the rail by its tail-grips, may coact with the winch A, Fig. 10, upon the boat, or with a winch carried by itself, while the other traction-motor runs ahead, paying out the hauling-line to get a fresh grip in advance, the foremost to be followed until overtaken by the rearmost, and so on; and when two motors are so used to haul the same load we may use an endless hauling-line, L, Fig. 10, passing from one motor, M, around the winding-drum of the winch A on the boat, wagon, car, or train to the other motor, M', on the rail R. In this case, when the winding-drum rotates, it simultaneously winds up one end of the hauling-line and unwinds the other end, or transfers the slack to that end which is being paid out, and sudden strains upon the hauling-line are thus prevented. Now, it will be seen that, if the winch A be of the requisite power and adapted to be reversed with the requisite promptness, or at uniform intervals suited to the length of the hauling line or lines, the traveling traction-motors may simply run ahead, paying out the hauling-line and gripping the rail, as aforesaid, leaving the hauling proper to be done by the winch or winches upon the boat, wagon, car, or train, or, when the hauling-ropes are distinct and attached to the boat, wagon, car, or train, by winches upon the traction-motors. To effect this the winches may be, and preferably are, power-driven and self-reversing, as illustrated by Figs. 4, 5, 6, and 7, 8, 9.

In Figs. 4, 5, and 6 an automatic intermittent winding-drum or self-reversing winch suitable for winding and unwinding the endless hauling-line L on board the boat, wagon, car, or train is shown in plan, end view, and side elevation, as aforesaid. A is the winding-drum proper. B is a wheel driven, together with its shaft, by a steam-engine, an electromotor, or manual power, always in one and the same direction. C is a spur-wheel loose on the same shaft. D is a spur-wheel which intermeshes with the spur-wheel C, and is fast on a parallel screw-shaft. (Represented by I.) E is another spur-wheel fast on this shaft; F, an idle-wheel in mesh with the spur-wheel E, and G a spur-wheel in mesh with the idle-wheel F and fast on the shaft of the drum A. H is a clutch-slide carried and rotated by the said shaft of the driving-wheel B, and adapted to interlock either with the hub of the spur-wheel C or with that of the spur-wheel G, according to its position. J is a lever loosely embracing the clutch-slide H, with an open fork, as shown in perspective detail in Fig. 6ª, and is provided with a weight, H², at its upper end. The shoulders H' of the clutch-slide, against which the edges of the lever strike to operate the clutch, are considerably wider apart than the width of the lever-fork. I² is a double-ended non-rotary screw-nut reciprocated by the said screw-shaft I, to which it is fitted, and is adapted to coact with the lower end of the lever J, which lies between the two ends of the nut and has freedom to move through a considerable angle therein.

In that condition represented by Figs. 4, 5, 6, 6ª, the drum A, receiving motion directly from the driving-shaft B through the clutch-slide H and the hub of the wheel G, is now turning in the same direction as said driving-shaft, as is also the screw-shaft I, while the nut I² on the latter is traveling toward its left-hand limit, the right-hand end of the double nut carrying over with it the lower end of the weighted lever H, and eventually, as at the point shown in the said figures, throws clutch-slide H out of lock with the wheel G and into lock with the wheel C by virtue of the action of the weight H², overbalancing the center. The drum A will then receive motion in a reverse direction through the wheels C D, screw-shaft I, and wheels E F G, while said screw-shaft, receiving its motion through the wheels C D, instead of through the wheels G F E, will turn in the same reverse direction, and thus an alternating or backward and forward motion will be imparted to the drum A with mechanical regularity.

Supposing, now, the drum A to be surrounded by one or more coils of hauling-line L, as indicated in Fig. 10, it will be seen that the self-reversing winch will first draw on one traveling traction-motor—M, for example—which will immediately affix itself to the rail R by its tail-grips X Z, while the other motor, M', relieved from holding strain, runs along the rail, taking up the slack in the hauling-line L between it and the winch A as produced by the unwinding effect of the latter on this end of the hauling-line, and so on alternately, the draft being in the example upon the motor M' at the next reversal of motion, then upon the motor M again, and so on, while the resultant draft upon the hauled load is substantially constant. When the boat, wagon, car, or train is provided with such a hauling-winch or with such hauling-winches, any known form of electrical traction-motors can be employed therewith, so long as each motor is furnished with tail-grips X Z, Figs. 1, 2, and 3, to maintain a firm hold on the rail against backward drag. If new or special traveling traction-motors be used, they may be furnished with similar self-reversing hauling-winches upon themselves and driven by their own electromotors, as illustrated by Figs. 7, 8, and 9 in side elevation, end elevation, and plan, respectively. In these figures, A² represents the winding-drum; M, the motor proper; K' J' I', rotary shafts parallel to each other, the latter being the screw-shaft; W, a worm-wheel fast on said shaft K', and driven continuously in an obvious way in one direction by an endless screw or worm, $w$, on the shaft of said motor M. C represents a spur-wheel loose on the said shaft K', and D one meshing therewith, which is fast on the said shaft J', the latter being the shaft of the said winding-drum $A^2$. G E represent intermeshing spur-wheels fast, respectively, on said shaft J' and said screw-shaft I'. Q represents a bevel-pinion loose on said shaft K', and $Q^2$ a like pinion intermeshing with said pinion Q and fast on the vertical driving-axle. And as in Figs. 4, 5, 6, $I^2$ represents the double-ended reversing-nut reciprocated by said screw-shaft I'; J, the clutch-lever, with weight $H^2$ fixed to the top, shifted by the said nut; and H, the clutch-slide shifted by the said lever, said clutch-slide being carried in this case by said shaft K', and adapted to interlock with said wheel C or with said pinion Q, each of which has a hub fitted thereto. And as in Figs. 4, 5, and 6, F' represents the frame of the motor; T, its traction-wheel fast on said driving-axle; P, its pressing-wheel; R, a double-flanged rail; $R^2 R^2$, weight-supporting wheels resting upon said rail, and X Z the tail-grips.

When the clutch-slide H is in lock, as shown, with the bevel-wheel Q, the drum $A^2$ is free to unwind, while motion is transmitted through the said worm-wheel W, shaft K', clutch H, pinions Q $Q^2$, and said driving-axle to said traction-wheel T, for propelling the traction-motor to a fresh holding-point in advance. During this period of travel the hauling-line unwinds, and the reverse motion of the drum $A^2$ is transmitted through the said shaft J', wheels G E, and screw-shaft I' to the double reversing-nut $I^2$, causing the arrest of the traveling motor and the commencement of winding, as follows: The nut $I^2$ in Fig. 8 is traveling toward its right-hand limit. On passing the position shown in Fig. 8, the lever J, moved by the left-hand end of nut, commences to withdraw the clutch-slide H from its contact with the hub of the pinion Q, and the weight $H^2$ being by that time over the center, the lever thus by its impetus carries over the clutch-slide H, so as to lock with the hub of the wheel C. When the clutch-slide H is in lock with the spur-wheel C, the whole force of the motor M is transmitted through the said worm-wheel W, shaft K', clutch H, wheels C D, and shaft J' to the winding-drum $A^2$, and, supposing this force to be utilized in hauling in upon a hauling-line and winding the same upon the drum $A^2$, the traction-motor will be standing still affixed to the rail R by the tail-grips X Z.

Meanwhile motion is being transmitted from said shaft J' through said wheels G E to said screw-shaft I', and the double nut $I^2$ travels toward its opposite or left limit, once more throwing the drum out of gear and causing the resumption of onward traveling by the motor. The hauling-line from the winding-drum $A^2$ would be simply made fast to the boat, wagon, car, or train, and two or more traveling traction-motors so furnished could obviously work alternately or in succession upon the same rail.

We have described in detail preferred forms of mechanism by means of which our invention can be carried into effect in the best way known to us at the date of our present invention; but we do not limit our claims thereto except as we may specifically state, as various known forms of the respective parts of the said mechanism may be used. For example, the traveling traction-motors used in connection with a winch upon the boat, wagon, car, or train, as hereinbefore first set forth, may be of either of the forms set forth in our application of even date herewith, filed April 18, 1883, for Letters Patent of the United States for improvement in electrical motors, (Patent No. 292,529,) and may travel upon rails, rods, or ropes, as therein set forth; and the means for conducting the electricity to and from the traveling traction-motors may be either of those set forth in said sister application or any of those which may be known or used; and we hereby disclaim, in favor of said sister application, the tail-grips X Z herein described apart from their use as an element of our haulage system.

We claim as our invention and desire to patent under this specification—

1. The combination of an electrical traction-motor furnished with tail-grips, a hauling-line, and a winding-winch, substantially as herein described.

2. The combination of two or more electrical traction-motors furnished with tail-grips, a hauling line or lines, and one or more self-reversing winding-winches, substantially as herein described.

3. The combination of two electrical traction-motors furnished with tail-grips, an endless hauling-line, and a self-reversing winding-winch upon the boat, wagon, car, or train, to effect systematic alternate haulage by winding, substantially as herein described.

London, March 22, 1883.

W. E. AYRTON.
JOHN PERRY.

Witnesses:
J. C. FELL,
S. P. WILDING.